United States Patent [19]

Tipton

[11] 4,175,899
[45] Nov. 27, 1979

[54] LIFTING DEVICE

[76] Inventor: Robert R. Tipton, 249 El Caminito, Livermore, Calif. 94550

[21] Appl. No.: 865,841

[22] Filed: Dec. 30, 1977

[51] Int. Cl.² .............................................. B66F 7/22
[52] U.S. Cl. .................................. 414/11; 254/10 C; 414/917
[58] Field of Search ............... 214/1 SW, 1 D, 130 R, 214/773, 777, DIG. 10; 254/3 R, 3 C, 10 R, 10 C; 414/10, 710, 11, 714, 917

[56] References Cited

U.S. PATENT DOCUMENTS

| | | | |
|---|---|---|---|
| 2,500,815 | 3/1950 | Gerli et al. | 214/DIG. 10 |
| 2,899,084 | 8/1959 | Brunnemer et al. | 214/1 SW |
| 3,522,898 | 8/1970 | Rotheisler | 214/773 X |
| 3,952,890 | 4/1976 | Armstrong | 214/DIG. 10 |
| 3,995,746 | 12/1976 | Usagida | 214/DIG. 10 |

FOREIGN PATENT DOCUMENTS 1455864  11/1976  United Kingdom ................. 214/1 SW

*Primary Examiner*—L. J. Paperner
*Attorney, Agent, or Firm*—Robert R. Tipton

[57] ABSTRACT

A device for raising and lowering sheets of building material utilizes a base support platform on which is attached a support bracket member and a pair of serially connected first and second parallelogram members pivotally joined by a right angle member with the other end of first parallelogram member pivotally connected to the base support platform and the other end of second parallelogram member pivotally connected to an object supporting platform. A spacer arm is pivotally connected to the support bracket and to one leg of the second parallelogram member proximately midway between pivotally connected ends to keep the object supporting platform on a long radius curve or generally straight vertical direction of movement. Hydraulic means are provided for actuating the spacer arm to raise and lower the object supporting platform.

1 Claim, 7 Drawing Figures

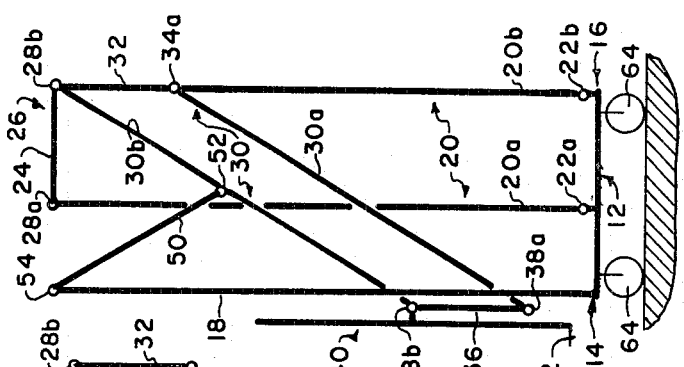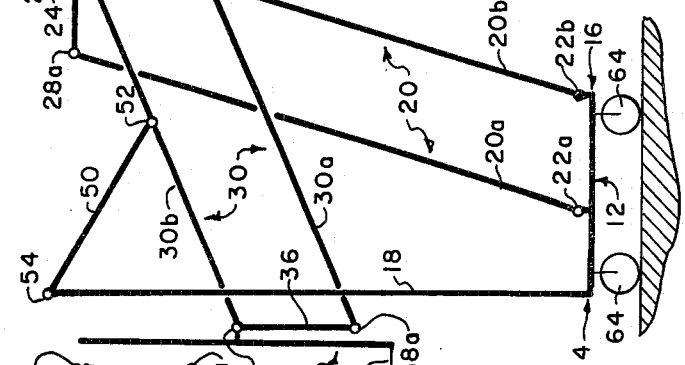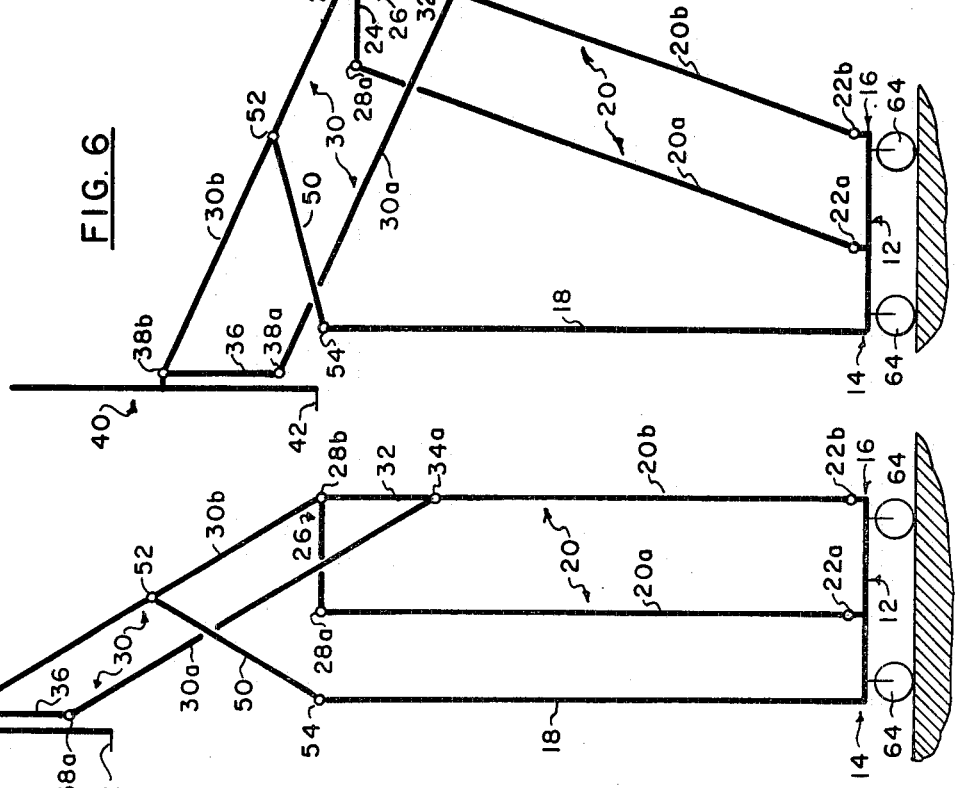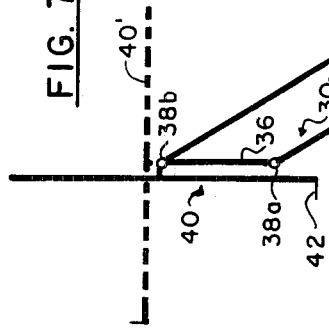

LIFTING DEVICE

BACKGROUND OF THE INVENTION

This invention relates generally to lifting devices and in particular to devices for lifting sheets of building material for application to walls and ceilings.

A number of prior art devices have been used for raising and lowering sheets of building materials and holding them in place while being fastened to a wall or ceiling. These prior art devices vary from a simple "T" bar brace used to hold a sheet of material against a ceiling to very complicated pulley and cable systems for raising and lowering a platform holding a sheet of material.

Such devices as the single "T" bar brace requires much muscle power and skill in getting the sheet into position such that it requires two men to handle it to avoid breaking the sheet material, especially gypsum board or sheet rock. The more complicated devices are generally more expensive to construct and more difficult to use.

SUMMARY OF THE INVENTION

The apparatus of the present invention utilizes both fixed and pivotally connected members comprising a base support platform on which is attached a support bracket and also on which is pivotally connected one end of a first parallelogram member whose other end is privotally connected to an angle bracket member, which is in turn pivotally connected to one end of a second parallelogram member whose other end is pivotally connected to an object supporting platform. A spacer arm is pivotally connected to the support bracket member and the second parallelogram member whereby the object supporting platform describes a long radius curve or a generally straight line of ascent and descent. Means are also provided for raising and lowering the object supporting platform by applying a force for rotation of the spacer arm.

It is, therefore, an object of the present invention to provide a device for lifting objects.

It is a further object of the present invention to provide a device for lifting sheets of building material which can be also used to transport the material to the building site and hold the material in place while being secured to the building.

It is another object of the present invention to provide a device for lifting building material in which the sheet remains parallel or at a fixed angle to the wall or ceiling while is is being raised and lowered.

It is still a further object of the present invention to provide a device for lifting sheets of building material in which the sheet of material is raised and lowered along a generally straight vertical line.

It is yet another object of the present invention to provide a device for lifting sheets of building material in which the sheet material is raised and lowered along a long radius arc or curve.

These and other objects of the present invention will become manifest upon study of the following detailed description when taken together with the drawing.

BRIEF DESCRIPTION OF THE DRAWINGS

FIGS. 4, 5, 6 and 7 are simplified drawings of the lifting device of the present invention illustrating the operation of the device at various elevations of the object supporting platform.

DESCRIPTION OF THE PREFERRED EMBODIMENT

Figure 1:
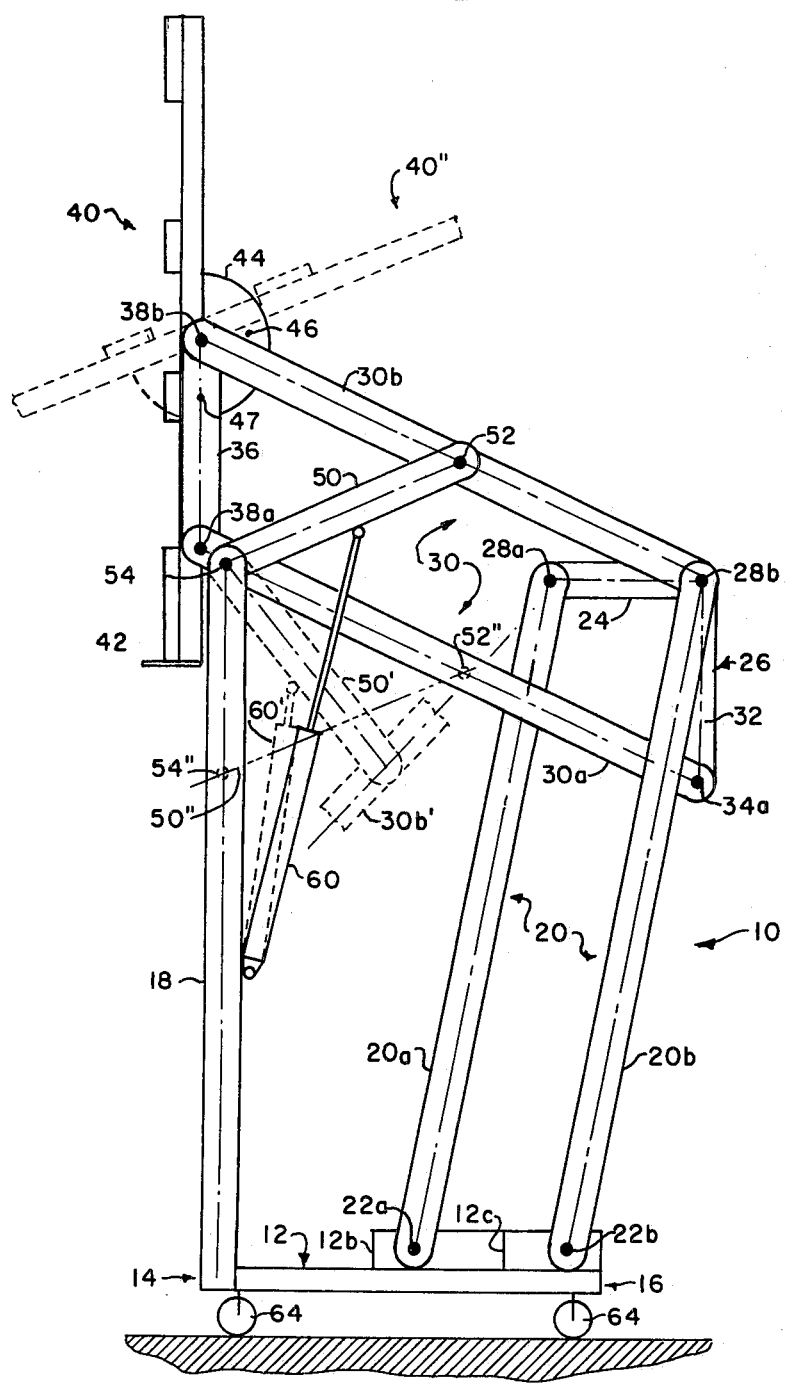
FIG. 1 is a simplified drawing of an end elevational view of the lifting device of the present invention showing the basic elements and pivot points and the location of the means for raising and lowering the device.

With reference to FIG. 1, there is illustrated an elevational end view of the lifting device 10 of the present invention comprising, basically, a base support platform 12 having a front edge or side 14 and a back edge or side 16, a vertical support bracket 18 attached to base support platform 12 proximate front side 14, a first parallelogram number 20 comprising support legs 20a and 20b which are pivotally connected at their lower ends to base support platform 12 at pivot points 22a and 22b, respectively, and pivotally connected at their upper ends to leg 24 of angle member 26 at pivot points 28a and 28b, respectively.

Lifting device 10 further comprises a second parallelogram number 30, comprising legs 30a and 30b, whose back or rear ends are pivotally connected to leg 32 of angle member 26 at pivot points 34a and 28b, respectively, with their front ends pivotally connected to platform support member 36 at pivot points 38a and 38b, respectively.

Lifting device 10 further comprises an object supporting platform 40 having a support lip 42 along its lower edge, which platform 40 is pivotally connected to support member 36 and parallelogram member 30 at pivot point 38b.

To maintain platform 40 along a generally straight vertical line of travel, lifting device 10 further comprises a spacer arm 50 having one end pivotally connected to parallelogram member 30 proximate its midpoint. In the embodiment illustrated, spacer arm 50 is pivotally connected to parallelogram leg 30b approximately midway between pivot points 28b and 38b at pivot point 52. The other end of spacer arm 50 is pivotally connected to the upper end of support bracket 18 at pivot point 54.

It should be noted that pivot point 54 is located at the same elevation as pivot point 28b when parallelogram member 20 is in the vertical position.

Spacer arm 50 could, if desired, also be pivotally connected to leg 30a of parallelogram 30, in which case, pivot point 54 would have to be lowered to point 54" at the same elevation as pivot point 34a. Spacer arm 50" (shown only as a longitudinal centerline) would then be pivotally connected to parallelogram leg 30a at pivot point 52".

Base support platform 12 is provided with wheels or casters 64 to facilitate movement of the apparatus about the job site.

To provide the force necessary to raise and lower object supporting platform 40, an hydraulic piston and cylinder combination 60, common in the art, is connected between support bracket 18 and spacer arm 50. The extent of movement of the hydraulic combination 60 is shown by the raised position of spacer arm 50 and hydraulic combination 60, in solid line, as compared with the lowered position of spacer arm 50' and hydraulic unit 60' shown in dashed lines. An hydraulic pump and control unit (not shown), common in the art, is used to activate the hydraulic combination 60.

It will also be noted that object support platform 40 can be rotated to position 40" (shown in dashed lines) being pivotally connected to and pivotal about pivot point 38b. To facilitate such positioning, and index plate or disk 44 is used which is attached to platform 40 and which has various index holes 46 therein adapted to receive index pin 47 passing through pin hole 48 (FIG. 3) in platform support member 36 and index hole 46 of index plate 44, thus holding object supporting platform fixed at the desired angle.

Figure 2:
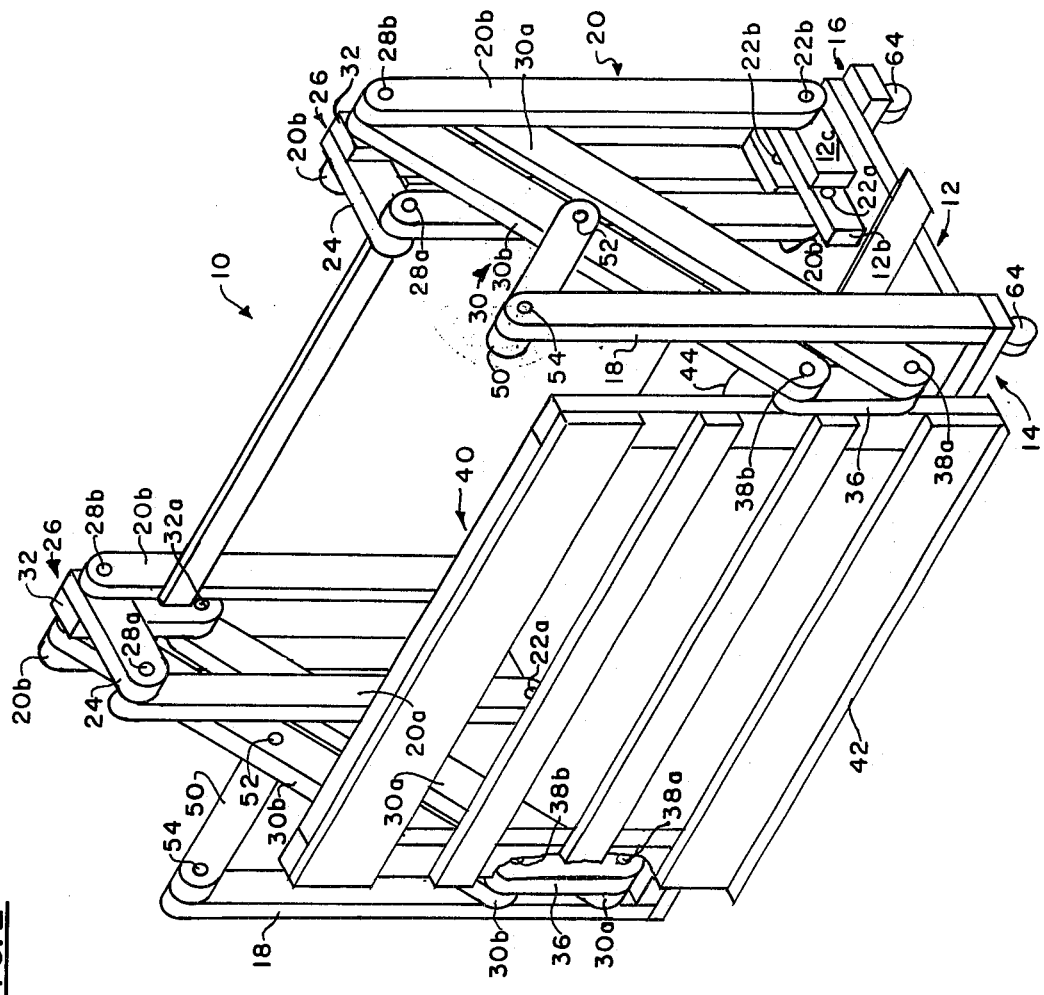
FIG. 2 is an isometric view of the assembled lifting device of the present invention.

With reference to FIG. 2, the corresponding elements of FIG. 1 are illustrated in isometric view and show both ends of lifting device 10 as mirror images of each other. For clarity, hydraulic lift combination 60 of FIG. 1 is not shown in FIGS. 2, 3, 4, 5, 6 and 7 but it can easily be seen how it can be added by connecting one end to support bracket 18 and the other end to spacer arm 50.

It will also be noted that leg 20b of parallelogram member 20 comprising two pieces which, in fact, act as one leg and for that reason, the same element number is used to identify both. In the embodiment illustrated in FIGS. 2 and 3, two leg members 20b are needed since the length of the axis of pivot point 28b is too long for a pivot pin or shaft member to be supported only at one end.

The term "point" is used here to mean the end view of a pivot axis. The same reference numerals are used for both the pivot point and the pivot axis.

Figure 3:
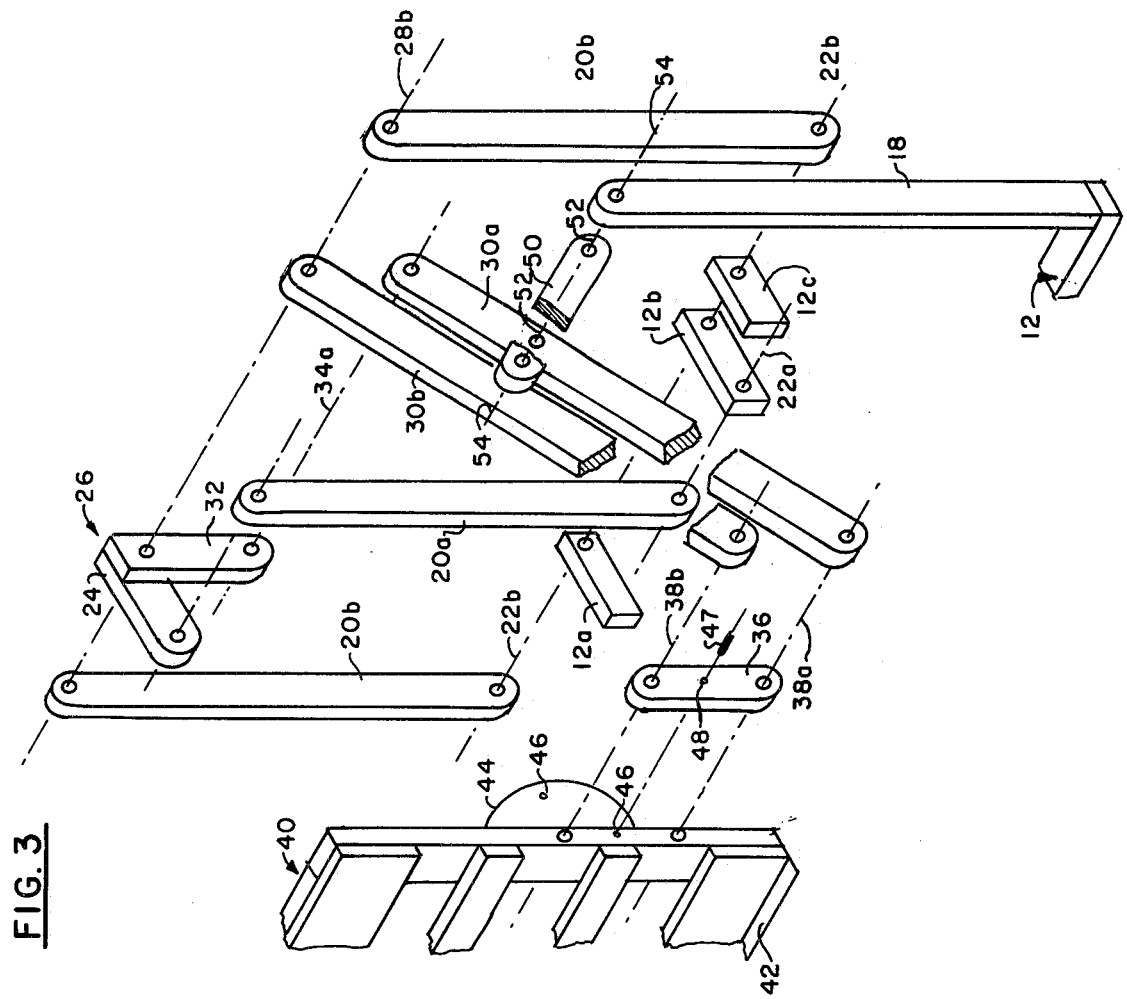
FIG. 3 is an exploded isometric view of one end of the lifting device of the present invention showing the method of assembly of the various elements and the center lines of the pivot points.

With reference to FIG. 3, there is illustrated an exploded view of one end of the lifting device 10 of FIGS. 1 and 2 further illustrating the relationship of the various elements to each other.

For clarity as to the fixed relationship of base support platform 12 relative to parallelogram member 20, pivot support blocks 12a, 12b and 12c, which are attached to base 12 and are used as the supports for pivot points 22a and 22b.

With reference to angle member 26, in the embodiment illustrated, leg 24 is attached to leg 32 to define a right angle. During operation of lifting device 10 of the present invention, the angular relationship of legs 24 and 32 of angle member 26 remains fixed.

With respect to the operation of lifting device 10 of the present invention, FIGS. 4, 5, 6 and 7 illustrate its operation at various lift positions during the lifting cycle.

FIG. 4 illustrates the position when object supporting platform 40 is at its lowest point and positioned such that the plane of a sheet of building material is supported in the vertical position. At this point, parallelogram member 20 is in the vertical position, spacer arm 50 is depending downwardly from pivot point 54 and hydraulic piston and cylinder combination 60 is compressed to its shortest condition.

With reference to FIG. 5, platform 40 is raised about ¼. It can be seen that parallelogram member 20 has pivoted backward while platform 40 has been raised along an approximately straight vertical line through the use of spacer arm 50 pivoting about pivot point 54.

Depending upon the length of spacer arm 50 and its point of connection to parallelogram member 30, platform 40 will describe either a straight line or a long radius curve.

By varying the length of spacer arm 50 and its point of connection to parallelogram 30, platform 40 can be made to describe a generally flat or long radius vertical arc or curve as it travels up or down.

Referring to FIG. 6, there is illustrated the lifting device 10 of the present invention with platform 40 raised about ¾ of its full travel further illustrating the motion of spacer arm 50, now depending upwardly from pivot point 54, and its relationship to platform 40. Also illustrated is the effect of angle member 26, shown as a 90 degree angle, to maintain platform support bracket 36 vertical, and platform 40 always at a fixed angular relationship to the floor, wall or ceiling during its upward and downward movement.

FIG. 7 illustrates the position of object supporting platform 40 to its highest elevation, and also illustrates the ability of platform 40 to pivot to a position 40' parallel to a horizontal ceiling for application of a sheet of building material thereto. It is also the position at which hydraulic piston and cylinder combination 60 (not shown) is extended to its full length.

Thus a sheet of building material can be raised, lowered or held in position relative to a wall or ceiling while it is being affixed thereto.

I claim:

1. Apparatus for lifing an object comprising
a support base having a front portion, a back portion and two ends,
a support bracket attached to said support base proximate the front portion thereof and extending upwardly therefrom and terminating in an upper end,
an angle member having two legs,
a first parallelogram member having a lower end pivotally connected to said support base and an upper end pivotally connected to said angle member,
a movable support platform,
a second parallelogram member having one end pivotally connected to said movable support platform and the other end pivotally connected to said angle member,
said second parallelogram member comprises an upper and lower leg member, one end of each leg member pivotally connected to one leg of said angle member, and the other end of each leg member pivotally connected to said support platform,
a spacer arm having one end pivotally connected to said support bracket and the other end pivotally connected to said second parallelogram member between said angle bracket and said support platform, and
said point of connection of said spacer arm to said support base is of a height above said support base approximately equal to the height above said support base of the pivotal connection to said angle member and said leg member to which said spacer arm is connected when said first parallelogram member is in the vertical position, and
means for raising and lowering said support platform.

* * * * *